(12) United States Patent
Van Huben et al.

(10) Patent No.: US 7,735,051 B2
(45) Date of Patent: Jun. 8, 2010

(54) METHOD FOR REPLICATING AND SYNCHRONIZING A PLURALITY OF PHYSICAL INSTANCES WITH A LOGICAL MASTER

(75) Inventors: Gary A. Van Huben, Poughkeepsie, NY (US); David A. Webber, Poughkeepsie, NY (US); Christopher J. Berry, Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 11/468,031

(22) Filed: Aug. 29, 2006

(65) Prior Publication Data

US 2008/0059952 A1 Mar. 6, 2008

(51) Int. Cl.
*G06F 17/50* (2006.01)
(52) U.S. Cl. .................................. 716/18; 716/1; 716/17
(58) Field of Classification Search ............. 716/1, 716/18
See application file for complete search history.

(56) References Cited

U.S. PATENT DOCUMENTS

| | | | |
|---|---|---|---|
| 5,812,130 A | 9/1998 | Van Huben et al. | |
| 5,920,873 A | 7/1999 | Van Huben et al. | |
| 5,966,707 A | 10/1999 | Van Huben et al. | |
| 6,088,693 A | 7/2000 | Van Huben et al. | |
| 6,470,458 B1 | 10/2002 | Dreps et al. | |
| 6,654,747 B1 | 11/2003 | Van Huben et al. | |
| 7,428,723 B2 * | 9/2008 | Greene et al. | 717/103 |

FOREIGN PATENT DOCUMENTS

CN 1490731 A 4/2004

* cited by examiner

*Primary Examiner*—Thuan Do
(74) *Attorney, Agent, or Firm*—John E. Campbell; Anthony England

(57) ABSTRACT

Design Data Management uses one copy of common data sets along with a plurality of instances, while continuing to utilize the existing design databases and existing CAD tools. Allowing a minimum amount of user intervention to create and maintain the common data set, Design Data Management employs replicating common data sets into one or more clone data sets. The method preferred provides for replicating and synchronizing one or more data sets with a master data set, comprises providing data design management of a master data set and at least one clone data set, and copying a master physical design data set into one or more physical instances to enable customization of said one or more physical instances. The master data set describes at least one of: a design component, a circuit macro, and a circuit entity, and comprises logical data sets, and it comprise physical design data sets. This permits all existing verification processes that are normally executed against the common data set to also be equally applied to the clones of said data set by way of automatic synchronization between of the common dataset and the clones.

21 Claims, 7 Drawing Sheets

Figure 1:
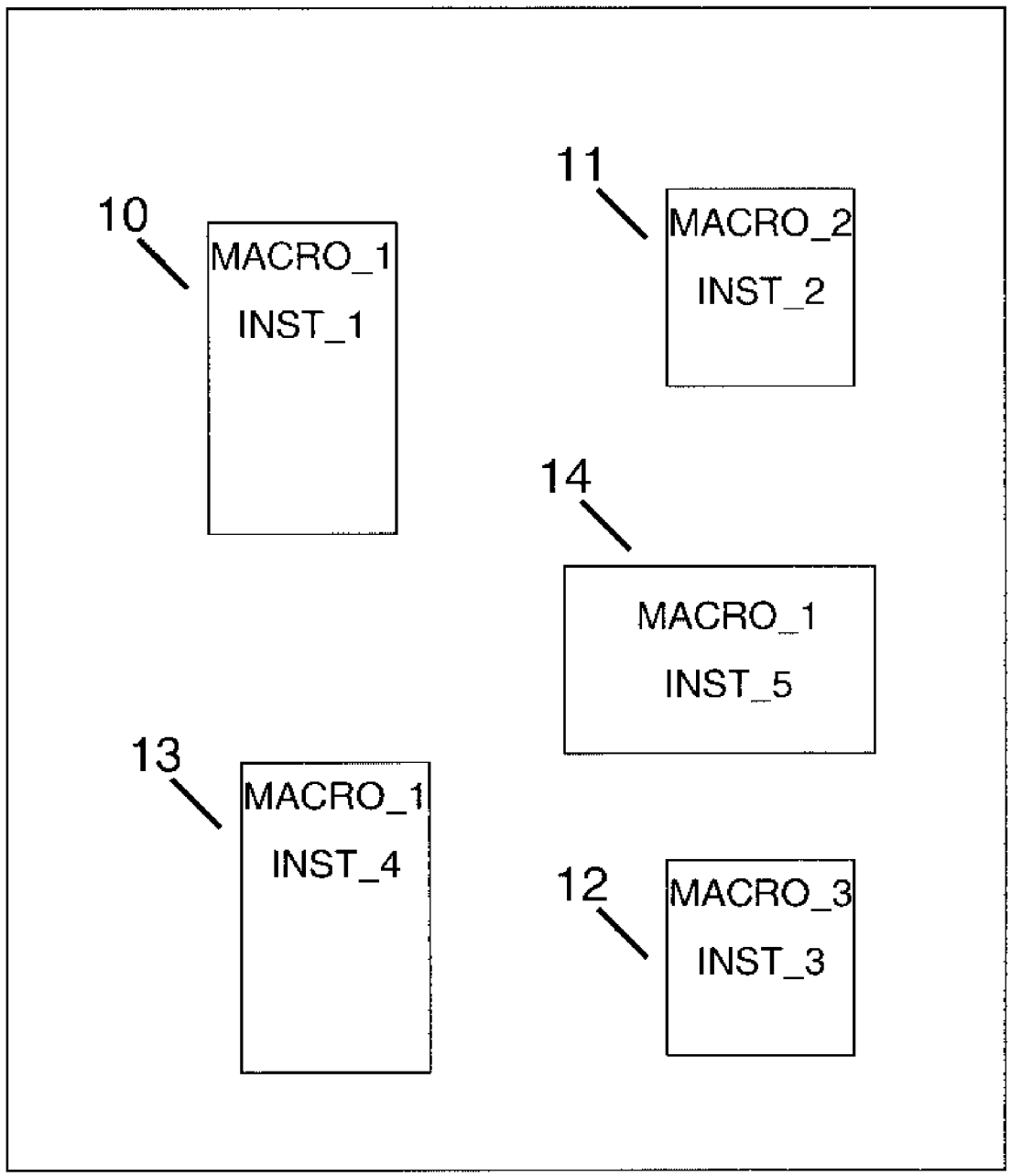

| MASTER | DATASETS | CLONE(S) |
|---|---|---|
| INV | VHDL | INV_H, INV_V, INV_F |
| FLIP_FLOP | VHDL, TIMING | LP_FLIP_FLOP |
| IO_DRV | HTML | IO_DRV1, IO_DRV2 |
| BUFFER | TIMING | BD1, WH3, SLEW |
| IORESIS | * | IORESIS[1:1000] |

```
-- INV_H automatically generated from inv vhdl 1.20  ⎫
-- Design Source /projectx/designlib/rel6/inv.vhdl  ⎬ 45
-- Created on 07/28/06 15:20:07                     ⎭

LIBRARY ieee;
USE ieee.std_logic_1154.all;
USE ieee.numeric_std.all;
USE work.std_ulogic_support.all;

ENTITY INV_H IS PORT (          ⎫
   DOUT : OUT std_ulogic;       ⎬ 46
   DIN  : IN std_ulogic;        ⎪
END INV_H;                      ⎭

ARCHITECTURE dataflow of INV_H IS  ⎫
BEGIN                              ⎬ 47
   DOUT <= NOT DIN;                ⎪
END dataflow;                      ⎭
```

FIG. 4B

METHOD FOR REPLICATING AND SYNCHRONIZING A PLURALITY OF PHYSICAL INSTANCES WITH A LOGICAL MASTER

TRADEMARKS

IBM® is a registered trademark of International Business Machines Corporation, Armonk, N.Y., U.S.A. Other names used herein may be registered trademarks, trademarks or product names of International Business Machines Corporation or other companies.

SECTION 1.01 BACKGROUND OF THE INVENTION

1. Field of the Invention

This invention relates in general to an improved method of managing design data for an integrated circuit for computers and digital systems and, in particular, to the management of design data associated with many unique physical copies of one logical entity.

2. Description of Background

The need to customize individual physical copies (known as "instances") of a particular building block, or macro, for an integrated circuit is becoming more common as the complexity and performance of those circuits increase. These macros can be as simple as a buffer or IO book, or as complex as an entire microprocessor core, as well as anything in between. There are numerous design requirements that drive the need for customization including, but not limited to; timing, power, physical form factor, physical orientation and circuit performance.

In past generations of digital and computer designs this was rarely a problem, as a conservative design approach could easily accommodate the physical constraints and requirements surrounding all the instances. The simple method of placing multiple identical copies of a macro on an integrated circuit was sufficient to meet the requirements of the design.

As the technologies and designs have evolved, this is becoming increasingly more difficult. For example, the clock speeds of present day microprocessors often require customized timing assertions and solutions not just for macros, but for each instance of every macro. Another example requiring customization is different physical orientation of an instance's copies. Older CMOS technologies accommodated various orientations of CMOS FET gates. However, in current CMOS technologies FET gates are often required to be aligned in one direction across the entire integrated circuit chip. So with a technology that requires FETS to be aligned in parallel, a simple chip floor planning operation like rotating one copy of an instance 90 degrees will require a new physical design for that copy with the gates in the original orientation. Likewise, in floor planning the chip the space available may require that various copies of an instance have different aspect ratios. Again, that requires the creation of unique physical instances. Another example is the tuning of IO book resistors, where there is one functionally all the IO books are identical but physically different resistor values are placed in the books to match the impedance of the line. All these eases require customization of the physical instance.

The data that describes a particular macro are typically stored in a database under the direction of Design Data Manager (DDM) that synchronizes and provides interlocks and accountability for the data. This data may consist of the logical description of the block (created with a tool using VHDL, Verilog, etc.), timing rules, audit status, physical implementation, and other data sets associated with a particular block. Computer Aided Design (CAD) tools use the data to craft an integrated circuit chip. Also the data sets provide information on the history, validity and authenticity of the design.

For the case of a macro that is replicated many times where all physical copies are identical, then the data management is straightforward since all copies can refer to the same master data sets. However in the eases described earlier, where the physical implementation of a copy has been customized then unique data sets that describe that physical implementation must be maintained in the database. Unfortunately many CAD tools and IC design methodologies require a consistent nomenclature of design entities and do not support sharing of data sets across design entities. These restrictions require a complete copy of all data sets for each unique physical copy even though many of the data sets may be identical. For example, the logical (VHDL) description may be the same for all IO books, but there may be hundreds of physical books with different resistor values, creating a need for hundreds of identical entries in the design database.

Historically, the common brute force approach was to make copies of all the data sets for each customized copy being used. This approach is simple and fits in with existing methodologies and data management. However, any logical updates must be replicated across all copies. For one or two copies of one or two logically unique blocks these approach works without much additional overhead. However the need to maintain hundreds or even thousands of copies becomes difficult and unwieldy with a brute force approach.

Another approach is to selectively copy the required data sets (physical design data), while keeping a single copy of the data sets that are common (logical data sets like VHDL data sets). This approach is desirable since it enables the common data to be easily managed, maintained and verified. However, as mentioned before most CAD tools and design methodologies enforce a consistent nomenclature of design entities and prevent the selective approach.

What is needed is a method that allows fi)r maintaining a single copy of data sets with a plurality of instances and yet allows for unique data sets describing the unique features of those instances that works within the framework of existing design databases and with existing CAD tools.

SECTION 1.02 SUMMARY OF THE INVENTION

The present invention allows for the use of one copy of common data sets along with a plurality of instances, while continuing to utilize the existing design databases and existing CAD tools. In particular, this method is intended to allow the minimum amount of user intervention to create and maintain the common data set by employing a method for replicating said common data sets into one or more clone data sets. The method described herein for replicating and synchronizing one or more data sets with a master data set, comprises providing data design management of a master data set and at least one clone data set, and copying a master physical design data set into one or more physical instances to enable customization of said one or more physical instances. The master data set describes at least one of: a design component, a circuit macro, and a circuit entity and comprises logical data sets, and it comprise physical design data sets. The logical data sets can be replicated into one or more instances of logical clone data sets. This permits all existing verification processes that are normally executed against the common data set to also be equally applied to the clones of said data set by way of automatic synchronization between of the common dataset and the clones. In this way, none of the quality assurance practices are compromised.

The manner by which the present invention seeks to achieve these goals is by application of the disclosed method steps which can be generally applied to any design structure either hierarchical or flat in nature. Furthermore, our invention complies with the rules set forth in most common design environments requiring a consistent nomenclature for data sets representing a particular design entity.

Disclosed herein are the method steps which generally consist of defining one or more design elements as a master to be used in the replication or cloning process. Additionally, the nomenclature for the cloned data sets is also defined, along with the number of desired clones. In general, our invention allows any data type to participate as a master and we further provide a method of tagging the resulting clone data set with pedigree information to ensure proper data management of the master clone relationship.

Upon defining the masters and clones, a plurality of means exists to initiate the cloning procedure either through explicit user interaction or through the use of an automated library process operating under complete control of a design data management facility. Initially, said means creates the clones, but these means are also available to perform iterative updates to the clones as the master is altered through the course of the design process.

A key aspect of the present invention is to decouple the physical design elements from the logical design elements thereby allowing the physical and circuit design teams to customize a multitude of instances of a design element (such as a circuit, macro, unit, etc.) without the need to maintain design changes to the corresponding logical data sets. For example, if three copies of an interface controller are needed, each with different physical attributes, then the original data set can be defined as a master, and two clones can be created. The logic and verification engineers only need to architect, simulate and iterate on the master logical description of the controller (i.e. the VHDL or Verilog description), while the physical design team can independently alter and customize the master and clone physical data sets. The data management aspects of the present invention ensure the logical description of the master is automatically maintained for both clones, regardless of how many times the master requires logic modifications.

Since proper data management is paramount, the present invention further employs methods to ensure proper synchronization between the master and clone data sets through the use of pedigree information and Bill of Material tracking. Furthermore, it exploits the boolean equivalence step found in most custom and large ASIC methodologies to prove functional equivalence between the cloned logical data sets and the customized physical design data sets.

Additional features and advantages are realized through the techniques of the present invention. Other embodiments and aspects of the invention are described in detail herein and are considered a part of the claimed invention. For a better understanding of the invention with advantages and features, refer to the description and to the drawings.

SECTION 1.03 BRIEF DESCRIPTION OF THE DRAWINGS

Figure 2:
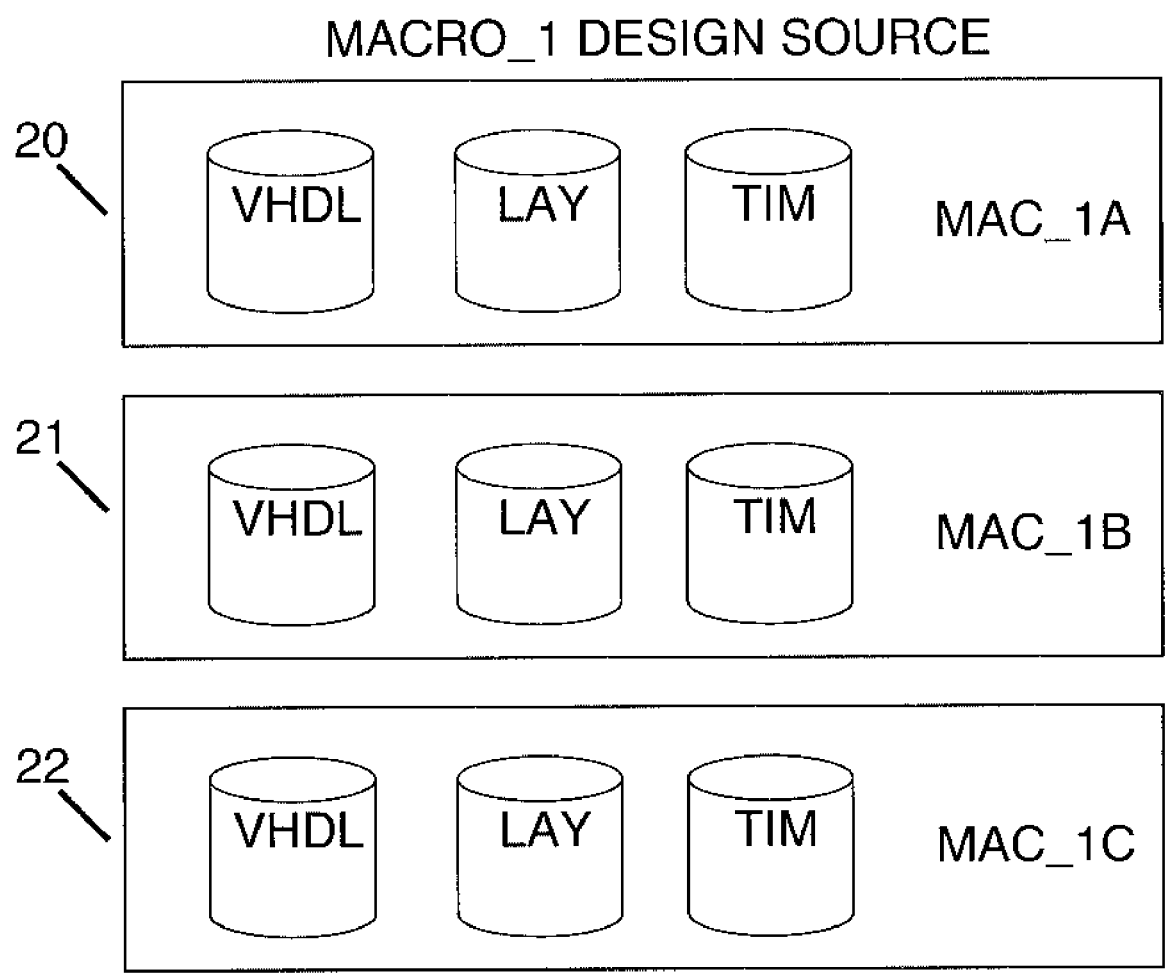
Figure 3:
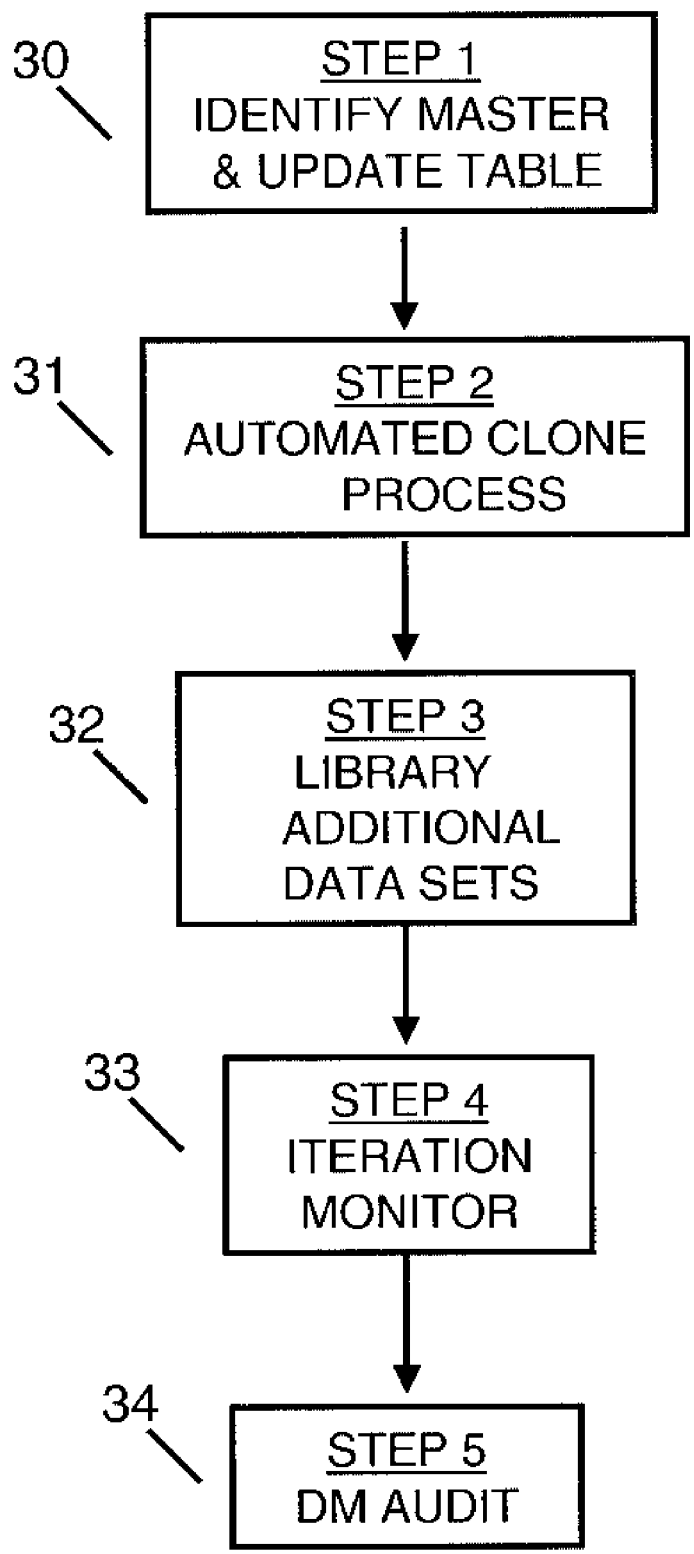
Figure 4A:
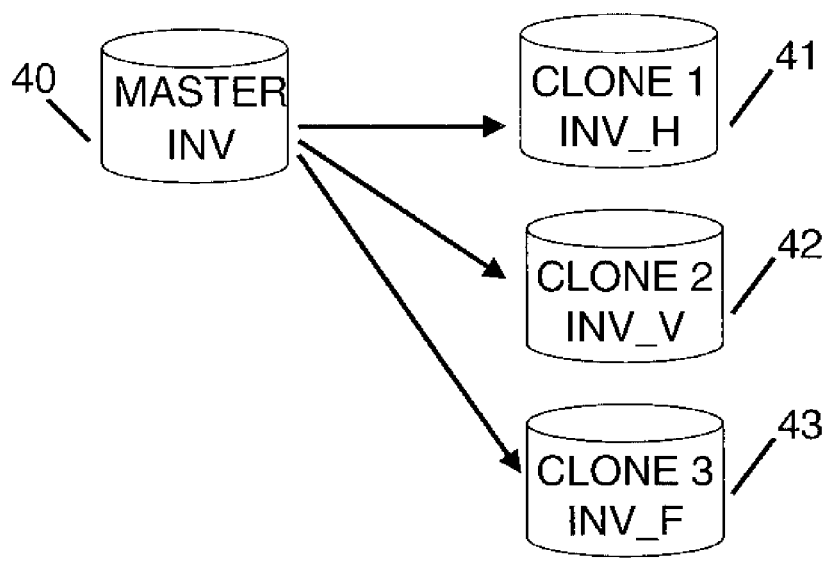
Figure 5:
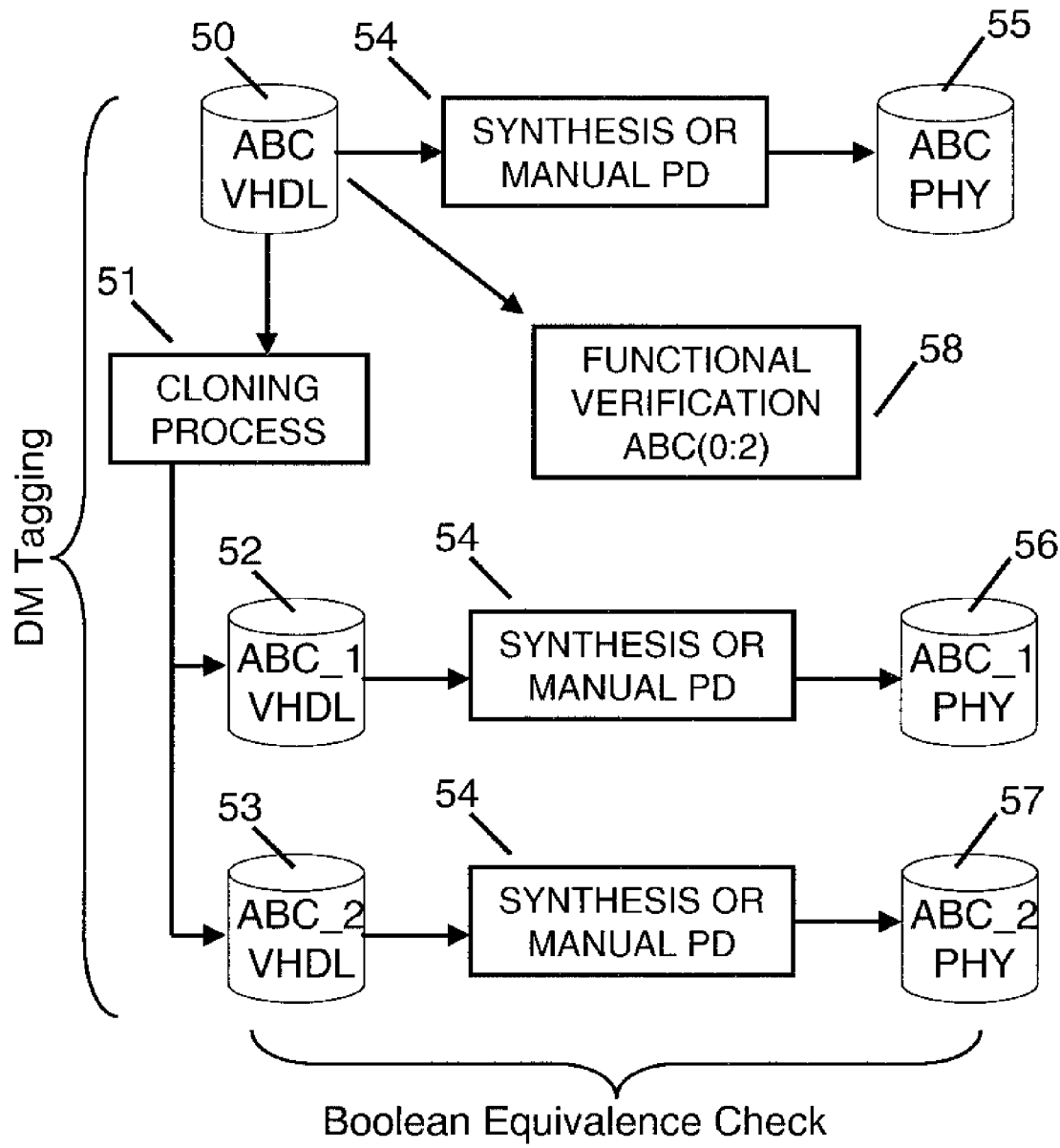
Figure 6:
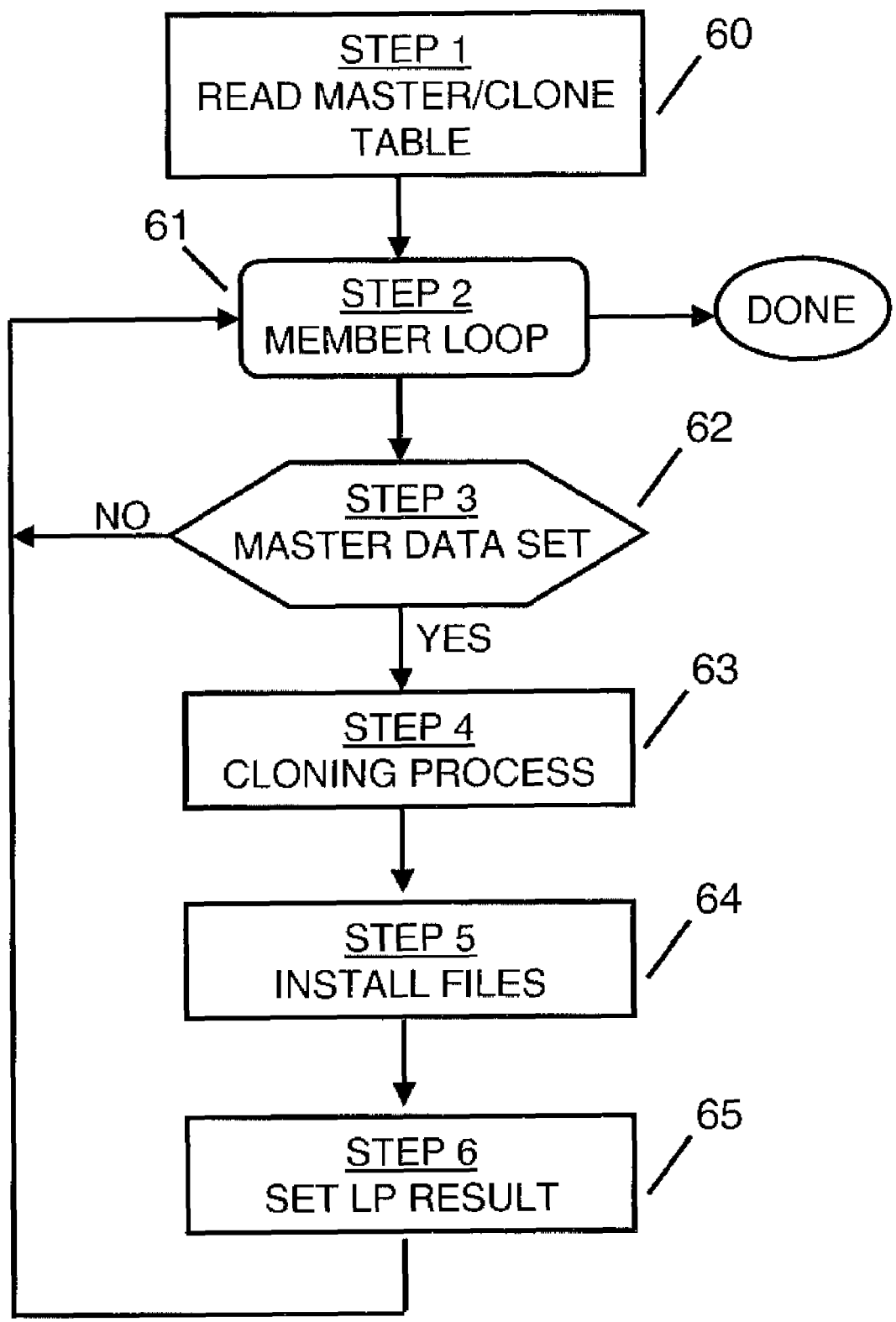

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 shows a typical physical design topology for which our invention is intended to be used FIG. 2 describes the most common approach for handling copy macros in physical design methodologies FIG. 3 shows the method steps of the present invention FIG. 4A uses an example to teach the use of the Master/Clone table FIG. 4B illustrates VHDL cloning on the same example from FIG. 4A FIG. 5 shows a typical design process flow employing the present invention FIG. 6 illustrates the use of an automated Library Process to perform the cloning process The detailed description explains the preferred embodiments of the invention, together with advantages and features, by way of example with reference to the drawings.

SECTION 1.04 DETAILED DESCRIPTION OF THE INVENTION

Turning now to the drawings in greater detail, it will be seen that FIG. 1 depicts a typical physical design structure comprising a plurality of physical entities hereafter referred to as macros. These macros defines arbitrary logic structure which typically have a hard physical boundary with absolute dimensions, aspect ratios, wiring layers, and they serve as the lowest level objects in the design hierarchy which participate in floor planning exercises. In FIG. 1, there are 3 unique macros denoted Macro_1 (10), Macro_2 (11) and Macro_3 (12), which exemplify three unique logic design structures. The complexity of the logic structure within a macro is completely arbitrary, so one of said macros could represent something as simple as an Input/Output block while another macro could describe a complex entity such as a memory controller. Each of these macros arc not only unique behavioral blocks, but each macro is instantiated into the design as a unique instance and given the names inst_1, inst_2 and inst_3.

Also included in FIG. 1 are two additional instances of Macro_1(10), known as inst_4 (13) and inst_5 (14). Unlike inst_2 and inst_3, which are unique entities, inst_4 and inst_5 are identical copies of inst_1. One skilled in the art can appreciate how these copy instances are commonly used for elements such as storage devices (arrays) wherein several copies of a low-level building block must be logically stitched together to create a larger functional block. Another common usage of copy instances are for buffering nets throughout a chip topology. Copy instances are a very effective way of reusing a generic building block to enable a plurality of logic functions.

One key aspect of copy instances is that the same data sets are used for each instance. Referring to FIG. 1, the 3 instances of Macro_1 (10, 13 and 14) all use the same logical description (such as VHDL), layouts, wiring contracts and timing assertions Another example depicted in FIG. 1 is the orientation of inst_5 (14) which is rotated 90 degrees with respect to the other instances of Macro_1 to achieve a different aspect ratio. In older, simpler technologies, it was possible to physically rotate a single layout. However, in today's complex methodologies this often isn't feasible, and a situation requiring instances of different aspect ratios typically translates into a need for each instance to have customized data sets.

FIG. 2 illustrates the most common solution in the industry today for resolving physical design challenges among a plurality of copy macros. Using Macro_1 as an example of a design component which is desirable to replicate, the drawing depicts three data sets for three instances (or copies) of Macro_1. The MAC_1A data set (20) comprises a piece of VHDL to describe the functional behavior, a LAYOUT file to describe the physical placement and wiring topology of the underlying gates, and a TIMING file to enumerate all the timing assertions, feedbacks and constraints. Although the example of FIG. 2 only depicts 3 files in the data set, one skilled in the art will appreciate how the data sets are closely related to the design methodology and can easily be extended to include a multitude of other files such as boundary contracts, pin listings, documentation, gate level netlists, technology rules, etc.

The second instance, MAC_1B (21), comprises the same data set, but in the common industry solution, some of these files would differ from their MAC_1A counterparts while others would be identical copies. For instance, if the physical challenge for MAC_1B centered around physical orientation or aspect ratios, then the LAYOUT would differ from the MAC_1A LAYOUT, but the TIMING file may be identical. Similarly, if MAC_1C (22) requires a unique timing solution, it may employ a customized TIMING file, while the LAYOUT may remain identical. In other circumstances, an instance may require customization to both the LAYOUT and TIMING files. In any event, the one file that almost always remains constant is the functional description, which is represented by the VHDL in FIG. 2. The most common approach to resolving these constraints is for the design team to start with physical copies of the "master" data set, and then customize the necessary files. In this example, the MACRO_1 data set would serve as the reference masters for creating the MAC_1A, MAC_1B and MAC_1C data sets.

Unfortunately one characteristic common to present day physical design tools and processes, such as the Cadence Design Framework, is the demand for all files comprising a data set to use the same macro or "cell" name. Thus, even though MAC_1B is functionally identical to MAC_1A, the tools prohibit the inclusion of the MAC_1A VHDL into the MAC_1B physical design data set. This process restriction is often resolved by simply copying the MAC_1A VHDL as MAC_1B and MAC_1C. Since they are functionally identical, it is known that as long as MAC_1A is functionally verified, then MAC_1B and MAC_1C are transitively verified in a conceptual manner. For smaller designs with a handful of copy macros, it is feasible to manually track the VHDL verification and ensure all copies of the VHDL are identical. However, as the need to employ copy macros on complex functions increases, many problems can ensue.

The first problem arises from a case wherein a massive number of copies must be made from a base macro. One example of such a situation is the inclusion of BR resistors in the preferred embodiment of the present invention. BR resistors are fabricated out of polysilicon and offer a great degree of control over their tolerance. They are prevalent in data transmission circuitry such as driver and receivers. Each instantiation of a BR resistor requires unique physical attributes, but they all refer to a relatively simple and constant piece of VHDL. The sheer number of BR resistor copies imparts substantial resource to manually copy and manage all the physical copies of VHDL. Furthermore, since most front-end verification methodologies strive to incorporate all pieces of the VHDL into verification models, this adds a great deal of unnecessary overhead to simulation model builds and potentially detracts from overall simulation performance.

A second problem which arises in complex designs, such as the preferred embodiment of the present invention, is the desire to use copy macros for complex I.P. structures such as a source synchronous interface macro. Source Synchronous interfaces are further described in U.S. Pat. No. 6,470,458, and are used to provide very high speed and high bandwidth interconnects by distributing a bus clock along with the data bits. The underlying functional macros are non-trivial and require substantial iteration through the verification process. Even with a small number of copy macros, manual management of the design iterations in order to synchronize the various copy VHDL files to the master VHDL is tedious at best, and error prone at worst.

The present invention seeks to resolve these problems through the use of the method by which one or more data sets pertaining to a first design component, designated as a master is automatically replicated into one or more corresponding clone data sets, wherein said steps are described in FIG. 3. Step 1 (30) consists of identifying which design component will serve as a master design component. This also includes identification of one or more data sets which will be replicated. Our invention permits a multitude of data sets to be replicated even though the majority of examples teach the invention through the use of replicating VHDL. Other examples of potential data sets for replication would be alternative high level or gate level descriptions such as ADA, Verilog or text-based netlists. Besides functional or logical data sets, the present invention also provides for replication of design documentation in the myriad of potential formats including HTML, XML or plain ASCII text. Since any text based file can participate in this method, it can also be applied to data sets such as timing assertions, pin lists, and test benches for verification.

FIG. 4A shows an example usage of our invention to replicate a component known as INV (40) which will become the master. In this example, the present invention will automatically replicate the requested data sets into three clones known as INV_H (41), INV_V (42) and INV_F (43). A practical situation for such an example would be the need for three variations of an inverter wherein INV_H (41) has a horizontal orientation, INV_V (42) has a vertical orientation and INV_F (43) is a high-power, high-speed variant. The master/clone table (44) contains the information which dictates how a master will be replicated. The preferred embodiment uses a data structure configured as a 3 column table wherein the first column denotes the master, the second column lists the data sets which should be replicated and the third column enumerates the identities of all the clones. In the example of FIG. 4A, the first record of said table declares the INV (40) as a master and instructs the present invention to create the 3 clones INV_H. INV_V and INV_F. In this case only the VHDL data set is replicated.

It should be noted that the master/clone table (44) contains additional records designed to illustrate a number of features of the present invention. For example, each master can have a unique list of data sets to replicate. There can be any number of data types, and the preferred embodiment utilizes a comma delimited list to define them. The last record also shows another variation wherein a * is used to indicate that all available data sets for the IORESIS master should be replicated.

In terms of the clones, the preferred embodiment permits the names of each clone to be enumerated. The number of clones is inferred from the list of names. For situations such as IORESIS, which calls for 1000 clones to be created, the preferred embodiment permits the use of shortcuts such as [1:1000] to automatically replicate the copies using the names IORESIS1, IORESIS2 and so on. Although FIG. 4A depicts several examples of defining clones, one skilled in the art can readily appreciate how the table can be implemented using a multitude of data structures with a variety of formats. It can also be seen that the present method of enumerating the clones and data sets can be easily be expanded to permit other shortcuts using pattern matching semantics such as those found in common programming functions like sed, awk, Perl, and so on.

Returning to the method steps of FIG. 3, Step 2 (31) is the Automated Cloning Process. In the simplest case, such as replicating a simple text file for a master, this step consists mostly of making a physical copy of the source data set using the clone name as the new file name. However, in a more complex case such as VHDL, several additional modifications are necessary. FIG. 4B shows a sample piece of VHDL for the INV_H (41) wherein the entity section (46) has been updated to replace the INV with INV_H in the entity declaration statement. Also, the architecture section (47) contains a similar modification in the architecture declaration. Without these modifications, the resulting clone VHDL would not be properly registered as INV_H to a typical VHDL compiler.

A further modification, which is applied to every clone file created regardless of data type, is the pedigree information (45) shown at the top of FIG. 4B. The preferred embodiment illustrates the use of text based files such as VHDL which permits the pedigree information to be embedded directly into the file. Our invention permits this section to be located anywhere within the file and will be inserted as comments adhering to the proper syntax depending on the target data set. In this case, the information, which shows the exact version and file name of the master data set, is implemented as VHDL comments. In the preferred embodiment, the pedigree information also includes a timestamp indicating when the clone was created. Although not shown, similar pedigree information could also be embedded into simple ASCII text files, HTML, XML or any other text based file.

Once the clone files are created, Step 3 (32) of FIG. 3 refers to checking the newly created clones into a data management repository. The preferred embodiment of the present invention utilizes the IBM Design Data Manager discussed in more detail by reference to U.S. Pat. Nos. 6,654,747 and 5,966,707. Although our embodiment contemplates the use of the IBM DDM, it should be noted to one skilled in the art that our invention can use any industry standard design management system offering basic version control capabilities along with mechanisms for depositing and querying the data sets, and provisions for defining policies or automated scripting. This step is a vital component in the present invention as it provides a critical link for the upcoming Data Management (DM) Audit step.

Another key aspect of our invention is Step 4 (33) which is the Iteration Monitor. This step employs an automated library process that executes each time a data set is checked into the design repository. The Iteration Monitor wakes up each time a new version appears in the library for any master declared in the master/clone table (44). The Iteration Monitor will automatically execute the algorithm in Step 2 (31) to create a new set of clones based on the information in the master/clone table (44). In addition, the newly created clones are automatically checked into the design repository. Although FIG. 3 shows the Iteration Monitor as a discrete step for purposes of teaching the invention, it should be noted to one skilled in the art that this step is a combination of Steps 2 and 3 and can be embedded in the actual implementation. For example, in the preferred embodiment of the present invention, the clones are initially created by the Iteration Monitor by simply performing a 2 step checkout/checkin procedure on the master once Step 1 is complete. The checkout/checkin acts as a trigger mechanism to kick off the Iteration Monitor to execute Step 2 (31) and Step 3 (32) without the need for user intervention.

The last step in FIG. 3 is Step 5 (34), the Data Management Audit. This step entails querying the data management facility for version information on all the clones at a particular level or release. For each iteration of every clone (including all the necessary data sets of each clone based on the definition in the master/clone table), our invention extracts the pedigree information in each clone. It then queries the data manager for the version identifiers of each master data set in that same level (or release) and compares the two entities. If the versions are not equal, then the master/clone relationship has been violated and must be rectified prior to tape out. Failure to do so runs the risk that physical design verification was performed on a design iteration that is not representative of that used for architectural and functional verification. As an additional check, the preferred embodiment also does a file compare of the clone data set against the master to ensure all the content is identical.

FIG. 5 illustrates the design flow of the preferred embodiment which demonstrates the advantages of the present invention over the prior art. In this example, macro ABC consists of a VHDL data set (50) which is identified as a master. The Cloning Process (51) (which consists of the Iteration Monitor for the preferred embodiment) is used to create two clone pieces of VHDL, denoted ABC_1 VHDL (52) and ABC_2 VHDL (53). The physical design team is free to process each piece of VHDL either through Synthesis or a Manual PD Process (54). A key aspect here is the ability to process all three clones independently thereby affording complete customization to meet any physical design challenge. The physical design team treats all three clones as discrete design components. The output of the Synthesis/Manual PD Process (54) are the physical design data sets for master ABC (55), and clones ABC_1 (56) and ABC_2 (57).

Another important feature of the present invention is that only the master ABC VHDL (50) participates in the Functional Verification model (58). This is accomplished by instantiating traditional copy instances of ABC, as denoted by the industry standard notation of ABC(0:2). The functional verification model assumes that the design employs three identical copies of this macro. This is a valid assumption for the functional model as long as the DM Audit Step (34) confirms that every clone is derived from the master. The last step in FIG. 5 consists of running a boolean equivalence check between each clone VHDL and its associated PD data set to ensure the physical design team implemented a matching logical embodiment.

Our invention contemplates an additional aspect in a further attempt to improve productivity and reduce manual design errors. This entails the use of a Library Process for purposes of automatically applying the cloning procedure to all appropriate masters each time they are iterated through the Design Data Manager (DDM). This relieves the design team of tracking design changes and manually executing the method steps outlined in FIG. 3. Although our invention generally permits the cloning method of FIG. 3 to be executed entirely as a manual process, the preferred embodiment performs all necessary steps under the control of the Library Process Manager. Although there are a multitude of design data management systems on the market with the ability to run automated processes (sometimes called scripts or policies), our embodiment uses IBM's DDM Library Process Manager, described by reference in U.S. Pat. Nos. 6,654,747, 6,088,693, 5,920,873, 5,812,130 and whose detailed description is beyond the scope of this application.

FIG. 6 describes the Clone Library Process (hereafter referred to as LP Clone). The present invention tangibly embodies said method steps as an application program which executes under the control of the Library Process Manager. The Library Process Manager in the IBM DDM permits the Library Administrator to define a plurality of automated steps to execute against desired data sets in the repository. The IBM DDM LP Manager comprises a great deal of flexibility which allows the Administrator to trigger said automated Library Processes during various data management actions such as checkout, checkin, promote, delete, etc. This allows the design team to find the best fit for their particular physical design methodology by triggering the cloning process whenever a data set is checked into the library, whenever a data set is promoted to a particular level (or release), or any combination thereof.

The LP Clone process begins with Step 1 (60) of FIG. 6 wherein the application locates and reads the Master/Clone table into an internal data structure. This is primarily done for efficiency and one skilled on the art can appreciate how an alternate embodiment could execute this step interactively with the forthcoming steps if performance is not an issue. Step 2 (61) establishes a Member Loop. In the preferred embodiment, the LP Manager interacts with the Design Data Management system to obtain a list of all the data sets undergoing the current DM action. For example, if a designer checks in four design components, the DDM will create a list of the four components including all the necessary information indicating their names, file types, source library level, target library level, timestamp info, etc. This list is known as a Member List, and the LP Manager makes it available to the application Library Process. Step 2 sets up a loop to process each member in this list.

Step 3 (62) checks each member in the Member List to see if it is a master component based on the internal data structure created from Step 1. In addition, it also checks to see if the data set being acted on is one of the target data sets defined in the Master/Clone table for that particular master. If neither condition is met, then control returns to the top of the Member List loop in Step 2 (61), and the next member is processed. If both conditions are met, then processing continues with the Cloning Process in Step 4 (63). This step comprises the necessary components of FIG. 3. In the preferred embodiment of the present invention, Step 4 (63) is actually implemented as the Automated Clone Process (31) described earlier. The application program is written in a manner by which is can be manually invoked by a user as an independent method step, in order to follow the process flow of FIG. 3, or it can be embedded into the Automated Library Process as Step 4 (63). This affords the greatest possible flexibility to the design community since the same application program can be run either privately by a designer, if they wish to create clones in their own private work space, or under the control of a Design Data Management system.

Next, Step 5 Installs the Output Files (64) into the DDM. For this step the preferred embodiment capitalizes on the installation feature present in the IBM DDM Library Process Manager. The detailed behavior of this step is covered by reference to the cited data management patents, but in general, this step is charged with integrating the newly created clone files into the DDM as if they were manually checked into the repository by a user. The high level steps entail:

registering this file with the DDM if it's a brand new data set with no prior version history checking the status of any locks which may exist on the file checking in a current version of the file (if it happens to be in a checked out state)

checking in the new file and obtaining a new (unique) version number physically depositing the file in the proper location space based on the DDM's file structure Finally, the LP Clone process concludes with Step 6 setting the LP Result (65). The LP Manager of the DDM in our preferred embodiment offers the ability for application programs to record a result which can range from a simple success/fail return code, all the way up to text commentary describing the outcome of the processing step. These pseudo process results can also include additional information about the processing such as statistical data gathered during the execution of the LP, timestamp information, or other forms of meta data. This information is kept in the DDM database and associated to the specific version of the data set being installed. Users can query these results as a means of quality control to ensure required library Processes executed successfully on design components prior to tape out.

Our invention also contemplates an alternate embodiment to permit a non text-based file to participate as a master data set. For example, a design component may include a plurality of data sets wherein one of them is the design documentation described in a proprietary file format such as Adobe PDF or Microsoft Word. These file formats can't be easily manipulated thereby precluding the embedding of pedigree information directly into a replicated data set as shown in FIG. 4B. To accommodate this type of data set, the preferred embodiment employs a tagging scheme using the IBM Design Data Manager wherein the LP Clone process sets a pseudo process result for each clone data set that has been replicated which includes the version identifier and timestamp information of the master data set from which the clone was made. In this alternate embodiment, the DM Audit step (34) of FIG. 3 would simply query the clone's pseudo process from the DDM as opposed to extracting the pedigree data from the file. In either case, the outcome is the same; extraction of pedigree information pertaining to the master that was used to create the clone being audited.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, as one means at least one, the plural is contemplated unless limitation to the singular is explicitly stated.

What is claimed is:

1. A method for replicating and synchronizing one or more data sets with a master data set, the method comprising:

providing, by a design data management ("DDM") computer system, management of a master data set and at least one clone data set, and copying a master physical design data set into one or more physical instances, including storing said one or more physical instances of the master physical design data set in a data repository accessible by the DDM computer system to enable customization of said one or more physical instances, and wherein the method includes:

identifying one or more design elements to serve as said master data set, and for said master data set:

a. defining the number of and data type of said at least one clone data set for said master data set, and b. identifying respective name and instance nomenclature for each of said at least one clone data set; and employing an automated process of the DDM computer system to create said clone data sets by replicating said master data set, wherein the identified one or more design elements participate in the replicating;

providing for associated pedigree information to establish a linkage between said master and clone data sets;

enabling a deposit into the DDM computer system of one or more additional data sets corresponding to the one or more design elements participating in the replicating, wherein said one or more additional data sets include additional physical design data sets, and:

a. independently altering said physical design data sets and/or b. customizing each of said physical design data sets pertaining to each of said clone data set;

utilizing an iteration monitor of the DDM computer system to automatically detect updates to said master data set;

further replicating said updated master data set into at least one new iteration of a corresponding one of the at least one clone data set;

employing a design data management audit to ensure said master data set is properly synchronized to each corresponding one of the at least one clone data set; and performing, by the DDM computer system, a file compare of the at least one clone data set against the master data set to ensure all content is identical for replicating and synchronizing one or more data sets with a master data set.

2. A method for replicating and synchronizing data sets with a master data set, the method comprising:

identifying one or more design elements to serve as a master physical design data set;

for said master data set, defining i) a number indicating how many clone data sets to create and ii) at least one of the following for each clone data set:

data type, name, and instance nomenclature;

creating the clone data sets by an automated process of the computer system replicating said master data set, wherein the identified one or more design elements participate in the replicating;

enabling a deposit of the clone data sets into a data repository accessible by the computer system, wherein the clone data sets provide additional data sets corresponding to the one or more design elements participating in the replicating, and wherein the additional data sets provide additional physical instances of the master physical design data set to enable customization of the physical instances;

utilizing an iteration monitor of the computer system to automatically detect updates to said master data set; and further replicating detected master data set updates into respective iterations of the clone data sets;

synchronizing the master data set updates to corresponding clone data sets; and performing, by the computer system, a file compare of each clone data set against the master data set to ensure identical content for replicating and synchronizing the clone data sets with the master data set.

3. The method according to claim 2 including a step of replicating logical data sets to one or more instances of logical clone data sets.

4. The method according to claim 2, wherein the method comprises:

the computer system enabling automated replication and iteration monitor steps to be configured as one or more of: automatic library processes, policies, and scripts;

an application library process is programmed to triggering "ON" basic data management actions including check-out, check-in, and promotion of a master data set in the computer system;

a Library Process Manager interacting with said application library process to present a member list of data sets being acted on by action of the computer system;

said library process automatically filtering out any data sets not participating in the master/clone process by interaction with the master/clone data structure;

processing and replicating each member matching the definition in the master/clone table into the prescribed clone data sets; and installing resulting clone data sets into the computer system by:

(1) registering a file with the computer system if the file is for brand new data set with no prior version history;

(2) checking the status of any locks which may exist on the file;

(3) checking in a current version of the file if the file happens to be in a checked out state;

(4) checking in the new file and obtaining a version number for the new file;

(5) physically depositing the file in a location space based on a file structure of the computer system; and (6) setting a library process result for each installed clone data set which may include success/fail return code, timestamp information and other arbitrary meta data.

5. The method according to claim 2 including:

automatically embedding pedigree information data compromising a version or iteration identifier and timestamp information of a corresponding master data set and embedding said pedigree information data directly into said cloned data set in the form of comments when said master data set is a text based file; and employing a version control tagging scheme to associate the version identifier of the clone data set to the version identifier of the corresponding master data when said master data set is a proprietary file format.

6. The method according to claim 2 comprising:

a data management audit comparing pedigree information of said clone data sets to the latest release version of corresponding master data sets to ensure all masters and corresponding clones are properly synchronized prior to a tape out.

7. The method according to claim 2 wherein the master data set comprises logical data sets, the logical data sets being replicated into instances of logical clone data sets and identified to serve as said master data set.

8. The method according to claim 7 including:

defining for a plurality of master data sets the number of and data type of a plurality of said clone data sets for each said master data set, and identifying names and instance nomenclature for each of said clones.

9. The method according to claim 8, including:

employing an automated process to create said clone data sets by replicating said master data sets, and, providing for associated pedigree information to establish a linkage between said master and clone data sets.

10. The method according to claim 9, including:

altering said physical instances of the master physical design data sets; and design data sets.

11. A computer system capable of reading instructions from a tangible storage media and responsively performing a method comprising:

identifying one or more design elements to serve as a master physical design data set;

for said master data set, defining i) a number indicating how many clone data sets to create and ii) at least one of the following for each clone data set:
data type,
name, and creating the clone data sets by an automated process of the computer system replicating said master data set, wherein the identified one or more design elements participate in the replicating;

enabling a deposit of the clone data sets into a data repository accessible by the computer system, wherein the clone data sets provide additional data sets corresponding to the one or more design elements participating in the replicating, and wherein the additional data sets provide additional physical instances of the master physical design data set to enable customization of the physical instances;

utilizing an iteration monitor of the computer system to automatically detect updates to said master data set; and further replicating detected master data set updates into respective iterations of the clone data sets;

synchronizing the master data set updates to corresponding clone data sets; and performing, by the computer system, a file compare of each clone data set against the master data set to ensure identical content for replicating and synchronizing the clone data sets with the master data set.

12. The computer system according to claim 11, wherein the computer system enables automated replication and iteration monitor steps to be configured as one or more of: automatic library processes, policies, and scripts;

wherein an application library process is programmed to trigger "ON" basic data management actions including checkout, check-in, and promotion of a master data set in the computer system;

wherein a Library Process Manager interacts with said application library process to present a member list of data sets being acted on by action of the computer system;

said library process automatically filters out any data sets not participating in the master/clone process by interaction with the master/clone data structure, and each member matching the definition in the master/clone table is processed and replicated into the prescribed clone data sets; and resulting clone data sets are installed into the computer system by:
(1) registering a file with the computer system if the file is for a brand new data set with no prior version history;
(2) checking the status of any locks which may exist on the file;
(3) checking in a current version of the file if the file happens to be in a checked out state;
(4) checking in the new file and obtaining a version number for the new file;
(5) physically depositing the file in a location space based on a file structure of the computer system; and
(6) setting a library process result for each installed clone data set which may include success/fail return code, timestamp information and other arbitrary meta data.

13. The computer system according to claim 11, wherein the computer system is further capable of performing a method comprising:

automatically embedding pedigree information data compromising a version or iteration identifier and timestamp information of a corresponding master data set and embedding said pedigree information data directly into said cloned data set in the form of comments when said master data set is a text based file; and employing a version control tagging scheme to associate the version identifier of the clone data set to the version identifier of the corresponding master data when said master data set is a proprietary file format.

14. The computer system according to claim 11, wherein the master data set comprises logical data sets, the logical data sets being replicated into instances of logical clone data sets and are identified to serve as said master data set.

15. The computer system according to claim 14, wherein the computer system is further capable of performing a method comprising:

defining for a plurality of master data sets the number of and data type of a plurality of said clone data sets for each said master data set, and identifying names and instance nomenclature for each of said clones.

16. The computer system according to claim 15, wherein the computer system performs steps comprising:

employing an automated process to create said clone data sets by replicating said master data sets, and, providing for associated pedigree information to establish a linkage between said master and clone data sets.

17. An article of manufacture comprising a tangible storage media, the article of manufacture comprising instructions readable by a computer system for performing a method comprising:

identifying one or more design elements to serve as a master physical design data set;

for said master data set, defining i) a number indicating how many clone data sets to create and ii) at least one of the following for each clone data set:
data type,
name, and
instance nomenclature;

creating the clone data sets by an automated process of the computer system replicating said master data set, wherein the identified one or more design elements participate in the replicating;

enabling a deposit of the clone data sets into a data repository accessible by the computer system, wherein the clone data sets provide additional data sets corresponding to the one or more design elements participating in the replicating, and wherein the additional data sets provide additional physical instances of the master physical design data set to enable customization of the physical instances;

utilizing an iteration monitor of the computer system to automatically detect updates to said master data set;

further replicating detected master data set updates into respective iterations of the clone data sets;

synchronizing the master data set updates to corresponding clone data sets; and performing, by the computer system, a file compare of each clone data set against the master data set to ensure identical content for replicating and synchronizing the clone data sets with the master data set.

18. The article of manufacture according to claim 17, wherein the article of manufacture comprises instructions readable by the computer system for further performing a method comprising:

automatically embedding pedigree information data compromising a version or iteration identifier and timestamp information of a corresponding master data set and embedding said pedigree information data directly into said cloned data set in the form of comments when said master data set is a text based file; and employing a version control tagging scheme to associate the version identifier of the clone data set to the version identifier of the corresponding master data when said master data set is a proprietary file format.

19. The article of manufacture according to claim 17, wherein a master data set comprises logical data sets, the logical data sets being replicated into instances of logical clone data sets and are identified to serve as said master data set.

20. The article of manufacture according to claim 19, wherein the article of manufacture comprises instructions readable by the computer system for further performing a method comprising:

defining for a plurality of master data set the number of and data type of a plurality of said clone data sets for each said master data set, and identifying names and instance nomenclature for each of said clones.

21. The article of manufacture according to claim 20, wherein the article of manufacture comprises instructions readable by the computer system for further performing a method comprising:

employing an automated process to create said clone data sets by replicating said master data sets, and providing for associated pedigree information to establish a linkage between said master and clone data sets.

* * * * *